United States Patent
Hongell et al.

(10) Patent No.: US 7,263,514 B2
(45) Date of Patent: Aug. 28, 2007

(54) EFFICIENT OBJECT QUERY PROCESSING TECHNIQUE ON OBJECT'S DYNAMIC PROPERTIES VIA PUSHDOWN

(75) Inventors: George F. Hongell, Santa Clara, CA (US); Chih-Cheng Hsu, Los Angeles, CA (US); Harisch R. Nayak, Morgan Hill, CA (US); David J. Wisneski, Morgan Hill, CA (US)

(73) Assignee: International Business Machines Corporation, Armonk, NY (US)

(*) Notice: Subject to any disclaimer, the term of this patent is extended or adjusted under 35 U.S.C. 154(b) by 1124 days.

(21) Appl. No.: 09/860,004

(22) Filed: May 17, 2001

(65) Prior Publication Data

US 2002/0184192 A1 Dec. 5, 2002

(51) Int. Cl.
*G06F 17/30* (2006.01)
*G06F 9/44* (2006.01)

(52) U.S. Cl. .............. 707/3; 707/2; 707/3; 707/4; 707/100; 707/200; 717/113

(58) Field of Classification Search .............. 707/1, 707/3, 4, 9, 10, 103, 203, 100, 102, 103 R, 707/8, 2; 704/272; 715/500; 709/201; 717/113, 717/141, 163, 165, 114, 137, 158
See application file for complete search history.

(56) References Cited

U.S. PATENT DOCUMENTS

| 5,673,401 A | 9/1997 | Volk et al. |
|---|---|---|
| 5,764,226 A | 6/1998 | Consolatti et al. |
| 5,813,020 A | 9/1998 | Hohensee et al. |
| 6,119,125 A | 9/2000 | Gloudeman et al. |
| 6,226,637 B1 * | 5/2001 | Carey et al. ............ 707/4 |
| 6,304,879 B1 * | 10/2001 | Sobeski et al. ........ 707/103 R |
| 6,430,556 B1 * | 8/2002 | Goldberg et al. ........ 707/4 |
| 6,564,368 B1 * | 5/2003 | Beckett et al. ........ 717/113 |

FOREIGN PATENT DOCUMENTS

| GB | EP 0877328 A2 * | 11/1998 |
|---|---|---|
| JP | 02185932 | 3/1992 |
| JP | 05183508 | 3/1995 |
| WO | WO95/14969 | 6/1995 |

OTHER PUBLICATIONS

"Dynamic Property Evaluation in Virtual Market Places," Research Disclosure, Jun. 1999, 1 page.

* cited by examiner

*Primary Examiner*—Cam Y Truong
*Assistant Examiner*—Ehichioya I. Fred
(74) *Attorney, Agent, or Firm*—Sawyer Law Group LLP

(57) ABSTRACT

The present invention provides a method and system for a query on dynamic properties of objects. The method includes: obtaining a query; determining that the query pertains to at least one mapped dynamic property; obtaining mapping data for the at least one mapped dynamic property; and translating the query for the at least one mapped dynamic property according to the mapping data to run against a database. The method uses the stored mapping data of the dynamic property to translate the query on the mapped dynamic property such that it may be run against the database. In this manner, queries on mapped dynamic properties are performed through pushdown rather than in object space. This increases the efficiency of the queries.

3 Claims, 3 Drawing Sheets

EFFICIENT OBJECT QUERY PROCESSING TECHNIQUE ON OBJECT'S DYNAMIC PROPERTIES VIA PUSHDOWN

FIELD OF THE INVENTION

The present invention relates to database networks, and more particularly to the execution of queries on objects in the database networks.

BACKGROUND OF THE INVENTION

FIG. 1 illustrates a conventional database network. The network comprises a plurality of clients 102, a network server 104, a Web Sphere™ server 106, and a bases a database 108 containing objects. The WebSphere server 106 is an applications server, developed by International Business Machines. Corp.™, which functions as an extension to the network server 104. The WebSphere server 106 allows users to write object-oriented application programs and to design or install custom objects. These objects are stored as table structures in the database 108. The WebSphere server 106 is typically used with relational database systems, such as DB2™ or Oracler™.

As is well known in the art, the objects in the database 108 have class definitions. The class definitions contain information concerning static properties in the objects 108. Static properties are the attributes defined in the class definition. Each of the static properties are mapped to a table column in the database 108, and this mapping data is stored as metadata. The metadata takes the similar form of a Structured Query Language (SQL) view and the query translation processes are based on relational view rewrite. Some objects also have dynamic property capabilities. Dynamic properties on the contrary are not defined in the class definition. They are typically used for customizing an application without changing the class definition. They can be accessed using getPropertyBy and can be set using setPropertyBy methods that are defined in the class definition. By storing these data as dynamic properties, the user need not change the object's class definition each time a dynamic property is added or deleted. As with static properties, the dynamic properties may each be mapped to a table column in the database 108. Alternatively, one or more of them may be unmapped, and instead be stored in an overflow column.

Oftentimes, a user wishes to execute queries on the objects in the database 108. The WebSphere server 106 contains a query service 110 for this purpose. For static properties, the query refers to the attributes of the class definitions for the objects. Using metadata, the query system translates the query into a query against the database schema, and this is referred to as "pushdown". If a query contains a method, instances of objects must be created and methods must be run on these instances, and this is referred to as running "in object space". Because dynamic properties are accessed using the methods, evaluating the queries with dynamic properties is done in object space. Running queries in object space is usually slower than pushdown, and thus is inefficient.

Accordingly, there exists a need for a method for efficient object query on dynamic properties. The present invention addresses such a need.

SUMMARY OF THE INVENTION

The present invention provides a method and system for a query on dynamic properties of an object. The method includes: obtaining a query; determining that the query pertains to at least one mapped dynamic property; obtaining mapping data for the at least one mapped dynamic property; and translating the query for the at least one mapped dynamic property according to the mapping data to run against a database. The method uses the stored mapping data on the dynamic property to translate the query on the mapped dynamic property such that it may be run against the database. In this manner, queries on mapped dynamic properties are performed through pushdown rather than in object space. This increases the efficiency of the queries.

DETAILED DESCRIPTION

The present invention provides a method for efficient object query on dynamic properties. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method in accordance with the present invention performs the query on mapped dynamic properties of objects against the class definitions of the objects. The method uses the stored mapping data on the dynamic properties to translate the part of the query pertaining to the mapped dynamic properties such that they are run against the database. In this manner, queries on mapped dynamic properties are performed through pushdown rather than in object space. This increases the efficiency of the queries.

To more particularly describe the features of the present invention, please refer to FIGS. 2 and 3 in conjunction with the discussion below.

Figure 1:
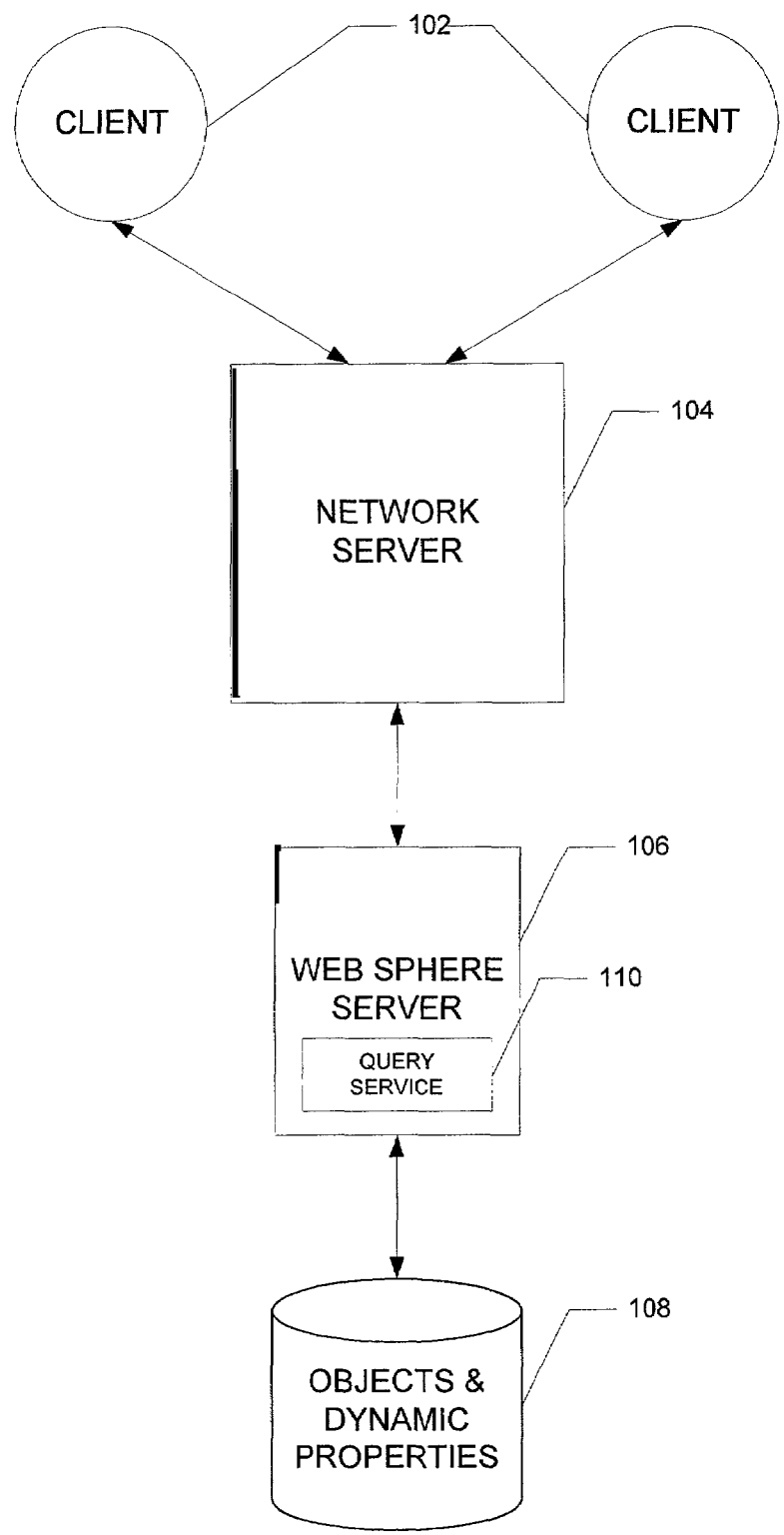
FIG. 1 illustrates a conventional database network.
Figure 2:
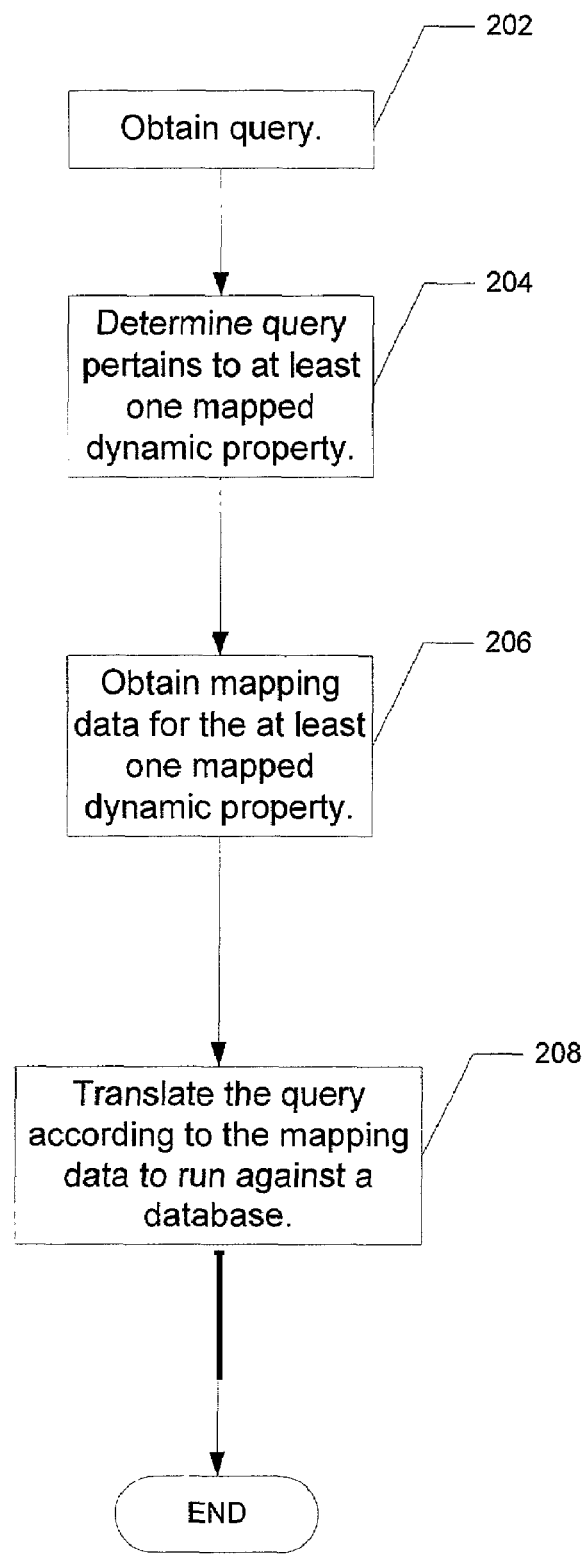
FIG. 2 is a flowchart illustrating a preferred embodiment of the method for an object query on dynamic properties in accordance with the present invention.

FIG. 2 is a flowchart illustrating a preferred embodiment of the method for an object query on dynamic properties in accordance with the present invention. First, the query is obtained, via step 202. The query service 110 then determines that at least part of the query pertains to at least one mapped dynamic property, via step 204. The mapping data for the at least one mapped dynamic property is then obtained, via step 206. This mapping data is used to translate the query to run against the database 108, via step 208. The query is then executed by the query service 110.

For example, consider the following employee class definition:

```
class employee {
    public int P1;
    public int P2;
    public Object getPropertyBy(String name),
    public void setPropertyBy(String name, Object value);
}
```

Assume that the employee class contains two static properties, P1 and P2, which are mapped to column 1 (C1) and column 2 (C2) of the database 108, respectively, of a table structure in the database 108. Assume that the employee class also contains three dynamic properties, A1, A2, and A3. A1 is mapped to column 3 (C3), and A2 is mapped to column 4 (C4). However, A3 is unmapped and thus is stored in the overflow column.

Assume that the following Object Oriented Structure Query Language (OOSQL) query has been obtained, via step 202:

Select e from eHome e
        where
            cast (e.getPropertyBy ("A1") as double)>21;

This query is seeking the collection of objects, "e", of the type employee from the collection of all employees in "eHome", which satisfies the conditions which follow "where". The cast operator is used in OOSQL when dealing with attributes or methods that return type object. Since the type of the value cannot be deduced from the class definition, the OOSQL cast operator must be used to specify this information in the query. Thus, the cast function is to convert the expression obtained by e.getPropertyBy ("A1") into the "double" data type.

Since the query refers to A1, the query service 110 determines that it pertains to at least one mapped dynamic property, via step 204. Using the metadata:

create object view_view1 signature (int P1, int P2, double A1, double A2) as select q1.C1, q1.C2, q1.C3, q1.C4 from eTable q1;

the query service 110 obtains the mapping data for A1, i.e., that A1 is mapped to C3, via step 206. The query service 110 then translates the query so that the part pertaining to A1 is run against column C3 of the database 108, via step 208. In the preferred embodiment, the translation is performed by replacing the cast statement for A1 with column C3 of the database. The translated OOSQL query then reads:

Select make_object (q1.*) from eTable q1
        where
            C3>21;

The above OOSQL query is then translated into the database query:

select q1.*from eTable q1
        where
            C3>21.

This query is then executed. Since the translated query now refers to a column in the table, the query may be run against the table's class definition, and no methods are run on the instances of the objects. The make_object function which constructs object references is done by the query service 110. In this manner, the query which pertains to a mapped dynamic property is performed through pushdown, not in object space. This increases the efficiency of the query.

Figure 3:
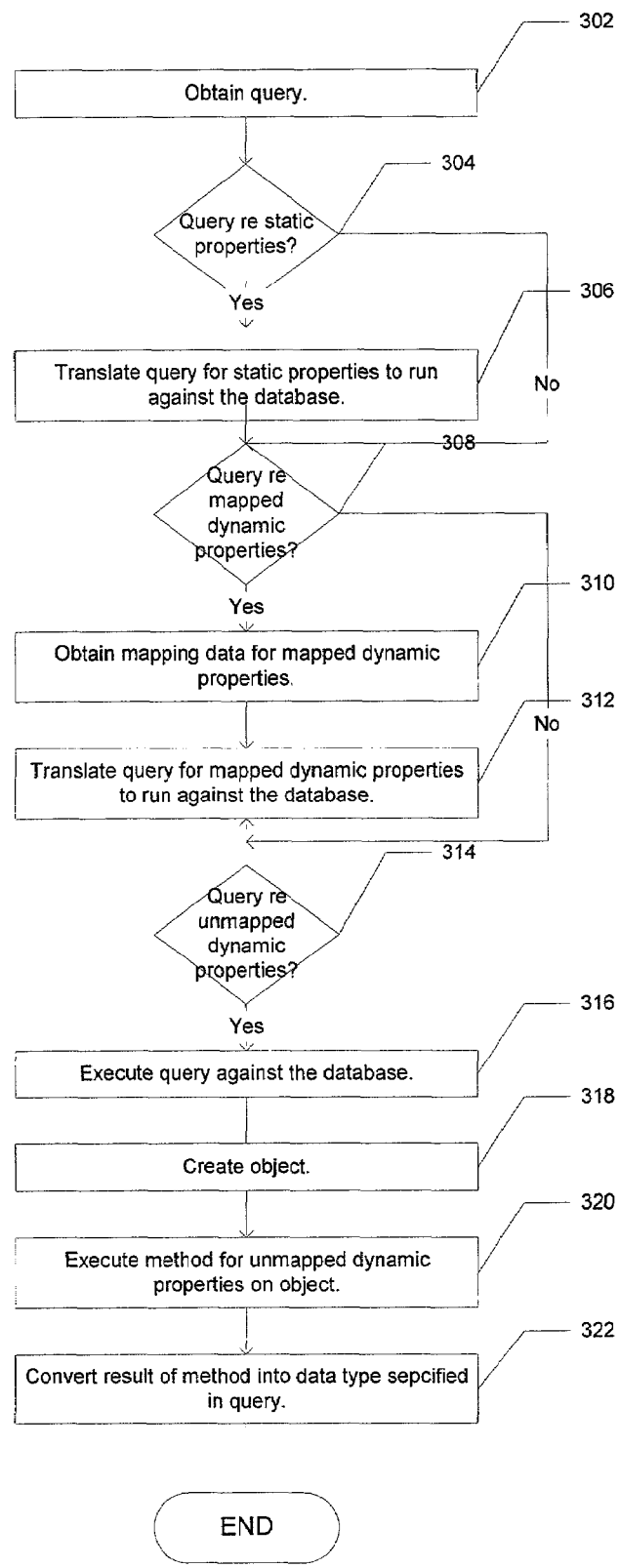
FIG. 3 is a flowchart illustrating in more detail the method for an object query on dynamic properties in accordance with the present invention.

FIG. 3 is a flowchart illustrating in more detail the method for an object query on dynamic properties in accordance with the present invention. For illustrative purposes, assume that the following OOSQL query is obtained, via step 302:

Select e from eHome e
        where
            cast (e.getPropertyBy ("A1") as double) > 21
            and P1 > 0
            and cast (e.getPropertyBy("A3") as double) > 25;

First, the query service 110 determines whether the query pertains to static properties, via step 304. Since the query has the condition "P1>0", P1 being a static property, the query service 110 then obtains the mapping data for P1, i.e., P1 is mapped to C1, via step 306. In the preferred embodiment, the translation is performed by replacing "P1" with its column, "C1".

Next, the query service 110 determines whether the query pertains to mapped dynamic properties, via step 308. Since the query has the condition "cast (e.getPropertyBy ("A1") as double)>21", A1 being a mapped dynamic property, the query service 110 obtains the mapping data for A1, i.e., A1 is mapped to C3, via step 310, and translates the part of the query pertaining to A1 to run against the database 108, via step 312. In the preferred embodiment, the translation is performed by replacing A1 with column C3 of the database 108.

Next, the query service 110 determines whether the query pertains to unmapped dynamic properties, via step 314. Since the query has the condition "cast (e.getPropertyBy ("A3") as double)>25", A3 being an unmapped dynamic property, the query service 110 has no mapping data for A3. The OOSQL query then reads:

select make_object (q1. *) from eTable q1
        where
            q1.C3 > 21
            and q1.C1 > 0
            and cast (make_object(q1. *).getPropertyBy("A3") as double) > 25;

The query service 110 then decomposes the OOSQL query into a database SQL query:

select q1. *from eTable q1
        where
            q1.C3 > 21
            and q1.C1 > 0.

The query is then executed, via step 316. The make_object function which constructs object references, via step 318, and invocation of the getPropertyBy method for the unmapped dynamic property, via step 320, and converting the expression obtained by getPropertyBy ("A3") into double data type, via step 322, is performed by the query service 110.

A method for an object query on dynamic properties has been disclosed. The method performs the query on mapped dynamic properties of objects against the database. The method uses the stored mapping data on the dynamic properties to translate the query on the mapped dynamic properties such that they may be run against the database. In this manner, queries on mapped dynamic properties are performed through pushdown rather than in object space. This increases the efficiency of the queries.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for executing a query on dynamic properties of a plurality of objects in a database, the method comprising:
    obtaining a query;
    determining that a first portion of the query comprises a method for accessing a dynamic property of the plurality of objects, determining that a second portion of the query comprises a reference to a static property of the plurality of objects, and determining that a third portion of the query comprises a method for accessing an unmapped dynamic property of the plurality of objects;

obtaining mapping data associated with the dynamic property of the plurality of objects, the mapping data mapping the dynamic property to a pre-determined location in the database;

translating the first portion of the query comprising the method for accessing the dynamic property in accordance with the mapping data such that the first portion of the query is executable against the pre-determined location in the database without creating instances of the plurality of objects;

translating the second portion of the query comprising the reference to the static property to execute against the database;

executing the query including
- executing the translated first portion of the query without creating instances of the plurality of objects;
- executing the translated second portion of the query; and
- creating an instance of the plurality of objects and executing the method for accessing the unmapped dynamic property on the instance of the plurality of and converting a result of the executed method into a data type specified in the query; and displaying a result of the executed query to a user.

2. The method of claim 1, wherein the translated first portion of the query is executed through pushdown.

3. A system for executing a query on dynamic properties of a plurality of objects in a database, the system comprising:
- a database including a table, the table comprising a plurality of columns; and
- a server coupled to the database, the server comprising a query service, wherein the query service is configured to
- obtain a query, wherein a first portion of the query comprises a method for accessing a dynamic property of the plurality of objects, a second portion of the query comprises a reference to a static property of the plurality of objects, and a third portion of the query comprises a method for accessing an unmapped dynamic property of the plurality of objects;
- obtain mapping data associated with the dynamic property of the plurality of objects, the mapping data mapping the dynamic property to a pre-determined location in the database;
- translate the first portion of the query comprising the method for accessing the dynamic property in accordance with the mapping data to execute against the pre-determined location in the database without creating instances of the plurality of objects;
- translate the second portion of the query comprising the reference to the static property to execute against the database;
- execute the query including
    - executing the first portion of the query comprising the
- method for accessing the dynamic property of the plurality of objects without creating instances of the plurality of objects;
    - executing the translated second portion of the query; and
    - creating an instance of the plurality of objects and executing the method for accessing the unmapped dynamic property on the instance of the plurality of objects and converting a result of the executed method into a data type specified in the query; and
- display a result of the executed query to a user.

* * * * *